UNITED STATES PATENT OFFICE.

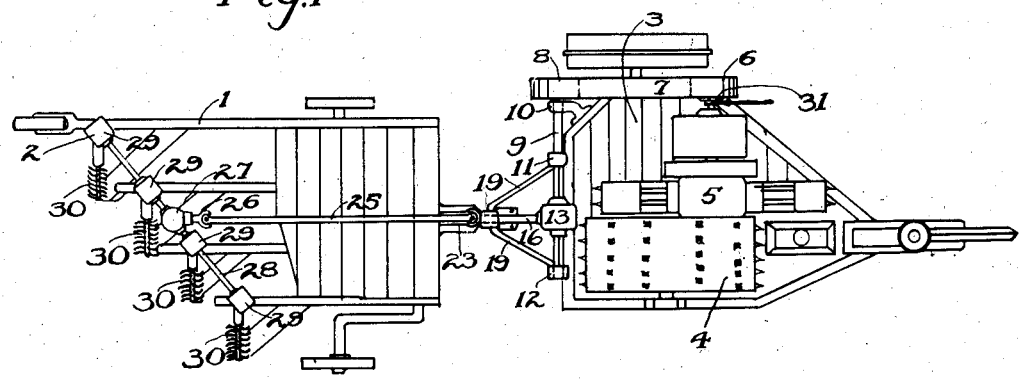
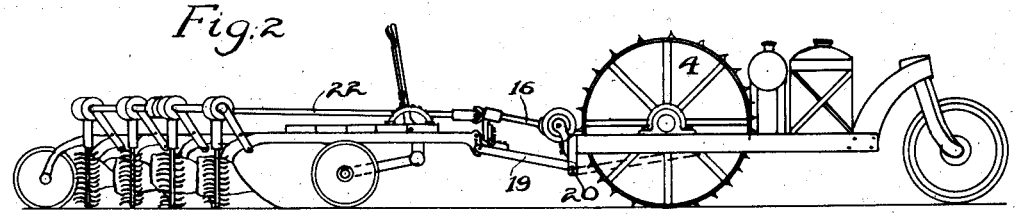
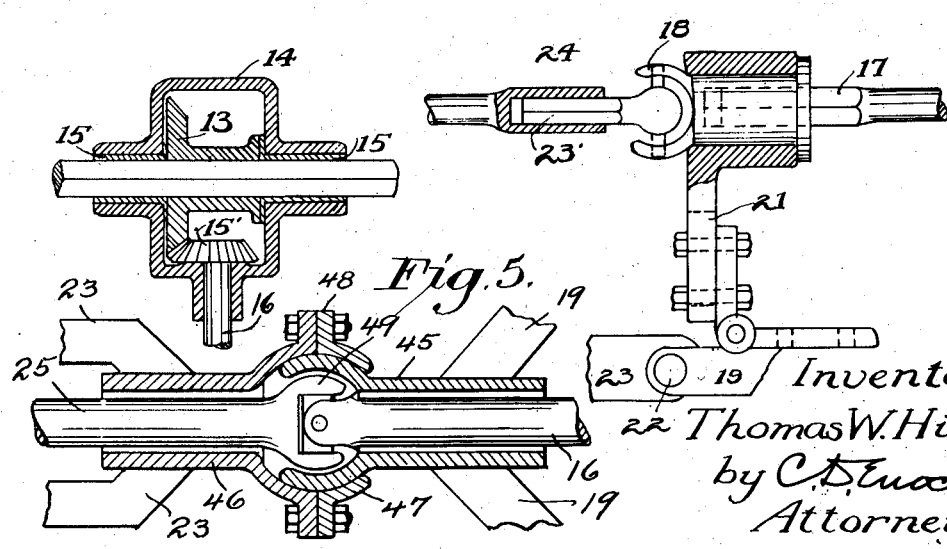

THOMAS W. HICKS, OF MINNEAPOLIS, MINNESOTA, ASSIGNOR TO SCIENTIFIC FARMING MACHINERY COMPANY, OF MINNEAPOLIS, MINNESOTA, A COMMON LAW COMPANY.

OPERATING MECHANISM FOR FARM MACHINERY.

1,369,431.  Specification of Letters Patent.  Patented Feb. 22, 1921.

Application filed March 22, 1917. Serial No. 156,789.

*To all whom it may concern:*

Be it known that I, THOMAS W. HICKS, a citizen of the United States, and a resident of Minneapolis, in the county of Hennepin and State of Minnesota, have invented certain new and useful Improvements in Operating Mechanism for Farm Machinery, of which the following is a specification.

One object of my invention is to provide means for operating a farm machine directly from power generated in a machine pulling or pushing the farm machine.

Another object of my invention is to provide means for hooking together a tractor and a farm machine and means for transmitting power from the tractor through, or adjacent to, the hitching point between the two machines.

Another object of my invention is to provide means whereby the drive may be made directly through the hitching point.

Another object of my invention is to provide means for connecting together a series of tillers and driving them from power generated in a tractor drawing the gang tiller.

With these and incidental objects in view, the invention consists of certain novel features of construction and combination of parts, the essential elements of which are hereinafter described with reference to the drawings which accompany and form a part of this specification.

Figure 1 is a plan view showing a tractor and a gang plow connected and driven in accordance with my invention;

Fig. 2 is a side elevation of the mechanism shown in Fig. 1;

Fig. 3 is a horizontal section showing in detail a gear connection between the jack shaft of the tractor and the transmission shaft between the tractor and the gang plow;

Fig. 4 is a detail, partly in elevation and partly in vertical section showing a universal joint connection with a transmission shaft; and Fig. 5 illustrates a modification of the structure shown in Fig. 4.

As shown in Fig. 1 and Fig. 2, a gang tiller 1 has four individual tillers 2, similar to that shown in my co-pending application for "tillers," Serial No. 154,611, filed February 10, 1917, mounted in gang fashion in a manner readily understood by any one skilled in the art.

The tractor 3 has one drive wheel 4 driven by a horizontally opposed internal combustion engine 5 which also drives a power pulley 6.

A belt 7 transmits power from this pulley 6 to a pulley 8 keyed or otherwise suitably fastened to a jack shaft 9, having suitable bearings 10, 11, and 12.

The jack shaft 9 is squared between bearings 11 and 12 and carries on the squared portion thereof, a bevel gear 13, better shown in Fig. 3, inclosed in a suitable gear case 14, journaled on bushings 15, which have inner squared apertures to fit the squared portion of the jack shaft 9.

The bevel pinion 15', keyed or otherwise suitably attached to a propeller shaft 16, meshes with a bevel gear 13.

The opposite end of the propeller shaft 16 is squared at 17, Fig. 4, and drives one member of the universal joint 18, and may also reciprocate therein to allow for variation in distance from the bevel gear 13, to the forward half of the universal joint 18, Fig. 1.

A pair of struts 19, Figs. 1, 2 and 4, are attached at 20, Fig. 2, to the draw bar of the tractor in the ordinary manner, side adjustment being obtained in any suitable way.

The two struts 19 are bolted, or otherwise suitably fastened, to a bearing 21, Fig. 4, in which is journaled the forward half of the universal joint 18, and the extreme end of the struts 19 are hinged at 22, Fig. 4, to a stub tongue 23 carried by the gang tiller.

The other half of the universal joint 18 has a squared end 23' adapted to drive a squared receiving socket 24 and reciprocating therein, and this receiving socket 24 forms the forward end of the shaft 25, Figs. 1 and 2, which drives preferably through a second universal joint 26, and a set of bevel gears 27 of ordinary construction, the transverse power shaft 28 which in turn drives through bevel gears 29, the rotor shafts 30.

To bring the power directly through the hitching point, I use a construction shown in Fig. 5, in which the struts 19 are suitably fastened to the inner half 45 of a ball and socket joint, the other half 46 of which is fastened in a suitable manner to the tongue 23. A cap 47, bolted at 48, retains the inner socket member in position.

In this construction the shaft 16 is connected by a universal joint 49 to the shaft 25 and the drive is actually through the exact hitching point.

A clutch 31, Fig. 1, of any ordinary type serves to engage or disengage the pulley 6 from the internal combustion engine and control the operation, through the medium heretofore described, of the tiller shafts 30, whose action has been described in my copending application aforesaid.

It is to be noted that in a tractor drawing a farm machine such as the one described, there is one common point only between the two machines and this is the point of hitch.

In order to transmit power with any degree of efficiency by mechanical means, it is necessary to drive through or in close approximation to this hitching point, as great mechanical difficulties would be experienced in turning corners or varying from a straight pull ahead either horizontally or vertically with the power transmitted at any considerable distance from the hitching point.

In taking care of the variations of hitch, advantage is taken of the squared portion of the shaft 9 to allow the positioning of the gear 13 and its case 14, in line with the point of hitch.

The line up between the tractor and the gang tiller, shown in Fig. 2, is, of course, with the plow shares out of the ground. When the shares are inserted and the tractor is pulling them forwardly, the hitching point drops so as to bring the plow beam and the hitching struts 19 into substantially a straight line, and in this position the shafts 22 and 16 are also in a straight line as the shaft 16 and struts 19 are at all times parallel.

While I have described my invention and illustrated it in several designs, I do not wish it understood that I limit myself to these constructions, as it is evident that my invention may be varied in many ways within the scope of the following claim.

Claims:

1. Operating mechanism for a gang tiller drawn by a tractor having an internal combustion engine thereon, comprising in combination with the rotor shafts of said tiller, a power shaft for driving said tillers, a propeller shaft in operative relation with said power shaft and extending to a point approximating the hitching point between said machines, means for transmitting the power from said internal combustion engine to a jack shaft at the rear of said tractor, and means for detachably connecting said jack shaft and said propeller shaft.

2. In a farm operating mechanism for a gang tiller having multiple rotor shafts thereon drawn by a tractor having an internal combustion engine thereon, the combination of a jack shaft on said tractor, means for driving said jack shaft directly from said internal combustion engine, a power shaft connected operatively with said rotor shafts, a propeller shaft connected operatively with said jack shaft and extending to the hitching point between said machines, a universal joint adjacent to said hitching point, one side of which is carried by said propeller shaft, a driving shaft in operative relation with said jack shaft, and attachable for operative relation with the other end of said universal joint by slidable means.

3. In operating mechanism for farm machines drawn by a tractor, the combination of a hitch extending from said tractor, a tongue extending from said farm machine, means for engaging said hitch and said tongue, a bearing carried by said hitch and having journaled therein one half of a universal joint, a propeller shaft engaged by slidable connection in driving relation with the other half of said universal joint, a driving shaft engaged by slidable connection with the journaled half of said universal joint, and means for connecting said driving shaft with power means on said tractor.

THOMAS W. HICKS.